United States Patent [19]

Kinoshita

[11] Patent Number: 5,487,438
[45] Date of Patent: Jan. 30, 1996

[54] DRIVING SYSTEM FOR AN ELECTRIC VEHICLE

[75] Inventor: Shigenori Kinoshita, Kawasaki, Japan

[73] Assignee: Fuji Electric Co., Ltd., Kawasaki, Japan

[21] Appl. No.: 118,309

[22] Filed: Sep. 9, 1993

[30] Foreign Application Priority Data

Sep. 11, 1992 [JP] Japan .................. 4-269369

[51] Int. Cl.⁶ .................................. B60K 1/00
[52] U.S. Cl. .............. 180/65.1; 180/65.6; 180/297; 310/83; 74/421 A
[58] Field of Search .................. 180/297, 65.6, 180/65.1; 310/83; 74/421 A, 413

[56] References Cited

U.S. PATENT DOCUMENTS

| | | | |
|---|---|---|---|
| Re. 13,853 | 12/1914 | Krohn | 310/83 |
| 1,614,031 | 1/1927 | Holmes | 310/83 |
| 4,108,015 | 8/1978 | Yanke . | |
| 4,130,172 | 12/1978 | Moody | 180/65 E |
| 5,089,734 | 2/1992 | Bickraj . | |

FOREIGN PATENT DOCUMENTS

| | | | |
|---|---|---|---|
| 1298362 | 6/1962 | France | 74/421 A |
| 51015 | of 0000 | Germany | 74/421 A |
| 3036465 | 5/1982 | Germany . | |
| 3043004 | 5/1982 | Germany . | |
| 5245009 | 4/1977 | Japan | 310/83 |
| 61-164443 | 7/1986 | Japan . | |
| 62-089403 | 4/1987 | Japan . | |
| 5116542 | 5/1993 | Japan | 180/65.6 |
| 5169991 | 7/1993 | Japan | 180/65.1 |

OTHER PUBLICATIONS

IECON '85, vol. 2, Nov. 22, 1985, pp. 477–482, C. C. Chan et al., "Control Strategy Of PWM Inverter Drive System For Electric Vehicles".

*Primary Examiner*—Kenneth R. Rice
*Assistant Examiner*—Min S. Yu
*Attorney, Agent, or Firm*—Spencer, Frank & Schneider

[57] ABSTRACT

A driving system for an electric vehicle which drives wheels thereof with the aid of an AC motor via an inverter while a battery is used as a power source is constructed such that the primary side and the secondary side of the AC motor are rotatably supported in a motor frame. One of the primary and the secondary sides of the AC motor is operatively connected to a power transmission shaft for one of a left-hand wheel and a right-hand wheel via a reversible type speed reducing mechanism while the direction of rotation of the power transmission shaft is reversed relative to that of the one of the primary and secondary sides. The other one of the primary and the secondary sides of the AC motor is operatively connected to a power transmission shaft for the other one of the wheels via a non-reversible type speed reducing mechanism while the direction of rotation of the power transmission shaft is kept unchanged relative to that of the other one of the primary and secondary sides. Electricity from the battery is fed to the coil on the primary side of the AC motor via the inverter and a slip ring.

12 Claims, 6 Drawing Sheets

5,487,438

DRIVING SYSTEM FOR AN ELECTRIC VEHICLE

CROSS REFERENCE TO RELATED APPLICATION

The present application claims the rights of priority of Japanese Patent Application No. 4-269369, filed in Japan on Sep. 11, 1992, and published Apr. 8, 1994 as laid-open publication (Kokai) 98408/1994 the subject matter of which is incorporated herein by reference.

BACKGROUND OF THE INVENTION

1. Field of the Invention

The present invention relates generally to an electric vehicle adapted to be driven with a battery as a power source. More particularly, the present invention relates to a driving system for an electric vehicle of the foregoing type.

2. Description of Related Art

To facilitate understanding of the present invention, two typical conventional driving systems, each employable, in an electric vehicle, will be described below with reference to FIG. 6 and FIG. 7.

FIG. 6 shows by way of a schematic plan view a conventional driving system for an electric vehicle including wheels which are each adapted to be driven by an AC motor of which AC current is fed from an inverter with a battery as a power source.

In the drawing, reference numeral 1 designates a battery, and reference numeral 4 designates an inverter for driving an AC motor 5 for driving wheels 81 and 82. Reference numeral 3 designates a protection fuse which is used as desired. In addition, reference numeral 2 designates a main switch with which the battery 1 is electrically connected to and disconnected from the inverter 4. An output shaft of the AC motor 5 is connected to a differential gear 7 via a speed reducing unit 6 in order to rotationally drive the wheels 81 and 82. Reference numerals 811 and 821 designate power transmission shafts which serve to transmit the rotational force generated by the AC motor 5 to the wheels 81 and 82, respectively. Reference numeral 9 designates conductors which connect the inverter 4 to the AC motor 5.

As is well known, the electric vehicle is driven with the battery 1 as a power source with the aid of the driving system constructed in the above-described manner. In fact, however, the following required of electric vehicles (hereinafter referred to simply as E-vehicle) in order that E-vehicles can be used in just the same manner as conventional internal combustion engine installed vehicles (hereinafter referred to as ICE-vehicle) are used.

1) Electric vehicles must have good drivability, that is,
   a. good acceleration performance,
   b. long distance driving capability on one battery charging, and
   c. good maneuverability.
2) Electric vehicles must have high reliability and good maintainability.

To meet the foregoing requirements, it is necessary that the following further requirements are satisfactorily met.

1) A driving system for an E-vehicle exhibits substantially the same drivability and reliability as that of an ICE-vehicle.
2) The driving system is designed with small dimensions and light weight and functions at high efficiency.
3. The driving system is manufactured at low cost.

In view of the requirements mentioned above, the conventional driving system shown in FIG. 6 is constructed such that an output from the AC motor 5 is transmitted to the wheels 81 and 82 via the speed reducing unit 6 and the differential 7 in order to rotationally drive the wheels 81 and 82. In spite of the structure employed for the conventional driving system, the following problems are left still unsolved.

1) Since the differential unit is mechanically designed and constructed, it is unavoidably manufactured at an expensive cost.
2) Efficiency of the driving system is undesirably reduced mainly due to mechanical loss derived from the speed reducing unit and the differential.
3) Maintenance service should periodically be performed for a lubricant in the speed reducing unit and the differential unit.

In contrast with the conventional driving system mentioned above, a driving system including no mechanical differential unit is exemplified by a driving system shown in FIG. 7. It should be noted that the components which are the same as the components shown in FIG. 6 are represented by the same reference numerals.

The driving system shown in FIG. 7 is constructed such that a left-hand wheel 81 and a right-hand wheel 82 are rotationally driven with the aid of separate driving systems. In FIG. 7, reference numerals 31, 41, 51 and 61 designate components constituting the driving system for the left-hand wheel 81 and reference numerals 32, 42, 52 and 62 designate components for the right-hand wheel 82. These components designated by the above reference numerals correspond to the components designated by reference numerals 3, 4, 5 and 6 in FIG. 6, respectively.

The driving system shown in FIG. 7 does not require any mechanical differential because AC motors 51 and 52 exhibit a differential function corresponding to the differential 7 shown in FIG. 6.

This non-mechanical driving system is entirely free from the problems inherent with the mechanical differential but has the following problems:

4) The non-mechanical differential is manufactured at an expensive cost with a heavy weight and large dimensions due to the necessity for mounting two sets of inverters, AC motors and speed reducing units.
5) Maneuverability of the E-vehicle having a non-mechanical differential is different from that of ICE-vehicles because the non-mechanical differential exhibits an electrical differential function.

In summary, the driving system of E-vehicles should satisfactorily meet the following requirements.

1) An E-vehicle should have the same maneuverability as that of the ICE-vehicle.
2) It should operate at high efficiency.
3) It should be manufactured at low cost with light weight and small dimensions.

In the circumstances mentioned above, many requests have been hitherto raised from users for providing a practical driving system for an E-vehicle which can satisfactorily meet the foregoing requirements.

SUMMARY OF THE INVENTION

The present invention has been made in consideration of the aforementioned background.

An object of the present invention is to provide a driving system for an electric vehicle which assures that maneuverability substantially equal to that of a conventional internal combustion engine driven vehicle can be obtained.

Another object of the present invention is to provide a driving system for an electric vehicle which operates at high efficiency and can be manufactured at low costs with light weight and small dimensions.

It should be noted that the "primary side" of an AC motor in the following specification represents the part of the AC motor corresponding to the stator of a conventional AC motor to which electricity is fed and the "secondary side" of the same represents a part of the conventional AC motor corresponding to a rotor adapted to be rotationally driven by the stator.

According to one aspect of the present invention, a driving system for an electric vehicle is provided which drives wheels thereof with the aid of an AC motor while a battery is used as a power source, comprising:

a motor frame, supporting means for rotatably separately supporting the primary side of the AC motor and the secondary side of the AC motor, respectively, relative to the motor frame, means for reversibly operatively connecting one of the primary side and the secondary side of the AC motor to a power transmission shaft for one of a left-hand wheel and a right-hand wheel, means for non-reversibly operatively connecting the other of the primary side and the secondary side of the AC motor to a power transmission shaft for the other one of the left-hand wheel and the right-hand wheel, and means for feeding electricity from the battery to the primary side of the AC motor.

To favorably construct the driving system, it is recommended that the primary side of the AC motor be fixedly secured to a cylindrical frame, while the secondary side of the AC motor is arranged inside the primary side of the AC motor.

Usually, the electricity feeding means may comprise a slip ring disposed around the outer periphery of the cylindrical frame, a brush adapted to be brought in contact with the slip ring, and a brush holder fixedly secured to the motor frame for holding the brush.

To construct a power transmission system associated with the driving system, the cylindrical frame may comprise an external gear arranged around the outer periphery thereof, and the external gear meshes with an internal gear operatively connected to the power transmission shaft for the other one of the left-hand wheel and the right-hand wheel.

The reversible connecting means may comprise a speed reducing mechanism having a pair of spur gears meshing with each other.

On the other hand, the non-reversible connecting means may comprise a speed reducing mechanism having an internal gear and an external gear to mesh with the internal gear.

Usually, the supporting means may comprise:

a first shaft and a second shaft operatively connected to the secondary side of the AC motor, a first bearing disposed in the motor frame to rotatably support the first shaft, a second bearing arranged extending inside of the motor frame to rotatably support the second shaft, and a third bearing disposed on the second shaft to rotatably support a cylindrical frame having the primary side of the AC motor fixedly mounted inside thereof.

Otherwise, the supporting means may comprise:

a first shaft and a second shaft operatively connected to the secondary side of the AC motor, a third shaft disposed along a rotational center axis of a cylindrical frame having the primary side of the AC motor fixedly mounted inside thereof, a first bearing arranged extending inside of the motor frame to rotatably support the first shaft, a second bearing disposed in the cylindrical frame to rotatably support the second shaft, and a third bearing disposed in the motor frame to rotatably support the third shaft.

In this case, a spur gear may be disposed on the third shaft to mesh with a spur gear disposed on the power transmission shaft for one of the left-hand wheel and the right-hand wheel, and a spur gear is disposed on the first shaft to mesh with an internal gear operatively connected to the power transmission shaft for the other one of the left-hand wheel and the right-hand wheel.

It is preferable that the power transmission shaft for the left-hand wheel may be arranged in alignment with the power transmission shaft for the right-hand wheel while extending along a common axis.

According to another aspect of the present invention, a driving system is provided for an electric vehicle which drives wheels thereof with the aid of an AC motor via an inverter while a battery is used as a power source, comprising:

a motor frame fixedly mounted on a vehicle body, means for separately rotatably supporting a frame to which a core and a coil on the primary side of the AC motor are fixedly secured and a rotor on the secondary side of the AC motor, the frame and the rotor being arranged on a common axis relative to the motor frame, means for operatively connecting the rotor to a first power transmission shaft for one of a left-hand wheel and a right-hand wheel while the direction of rotation of the first power transmission shaft is reversed relative to that of the rotor and a rotational speed of the first power transmission shaft is reduced from that of the rotor, means for operatively connecting the frame to a second power transmission shaft for the other one of the left-hand wheel and the right-hand wheel while the direction of rotation of the second power transmission shaft is kept unchanged relative to that of the frame and a rotational speed of the second power transmission shaft is reduced from that of the frame, and means for feeding electricity from the battery to the coil on the primary side of the AC motor via the inverter.

In addition, according to another aspect of the present invention, a driving system for an electric vehicle is provided which drives wheels thereof with the aid of an AC motor via an inverter while a battery is used as a power source, comprising:

a motor frame fixedly mounted on a vehicle body, means for separately rotatably supporting a frame to which a core and a coil on the primary side of the AC motor are fixedly secured and a rotor on the secondary side of the AC motor, the frame and the rotor being arranged on a common axis relative to the motor frame, means for operatively connecting the rotor to a first power transmission shaft for one of a left-hand wheel and a right-hand wheel while the direction of rotation of the first power transmission shaft is kept unchanged relative to that of the rotor and a rotational speed of the first power transmission shaft is reduced from that of the rotor, means for operatively connecting the frame to a second power transmission shaft for the other one of the left-hand wheel and the right-hand wheel while the direction of rotation of the second power transmission shaft is reversed relative to that of the frame and a rotational speed of the second power transmission shaft is reduced from that of the frame, and means for feeding electricity from the battery to the coil on the primary side of the AC motor via the inverter.

In the present invention, the primary side and the secondary side of an AC motor are rotatably separately arranged, respectively, such that they drive left-hand and right-hand wheels via a reversible type speed reducing mechanism and a non-reversible type speed reducing mechanism, respectively. With this arrangement, a wheel driving unit itself, which comprises the AC motor, the reversible type speed reducing mechanism and the non-reversible type speed reducing mechanism, performs the same differential function as that of conventional mechanical type differentials. It should be understood that both the wheels are rotated in the same direction with the aid of the reversible and the non-reversible speed reducing mechanisms.

According to the present invention, the following advantages are obtained:

1) Since the driving system does not require any conventional mechanical differential it can operate at high efficiency.

2) Since the AC motor, differential and speed reducing mechanisms can be constructed integrally, the driving system is manufactured at low cost with light weight and small dimensions as a whole.

3) The electric vehicle with the driving system exhibits the same maneuverability as that of conventional ICE-vehicles.

The above and other objects, effects, features and advantages of the present invention will become more apparent from the following description of embodiments thereof taken in conjunction with the accompanying drawings.

BRIEF DESCRIPTION OF THE DRAWINGS

The present invention is illustrated in the following drawings in which.

DESCRIPTION OF THE PREFERRED EMBODIMENTS

The present invention will now be described in detail hereinafter with reference to the accompanying drawings which illustrate preferred embodiments thereof.

Figure 1:
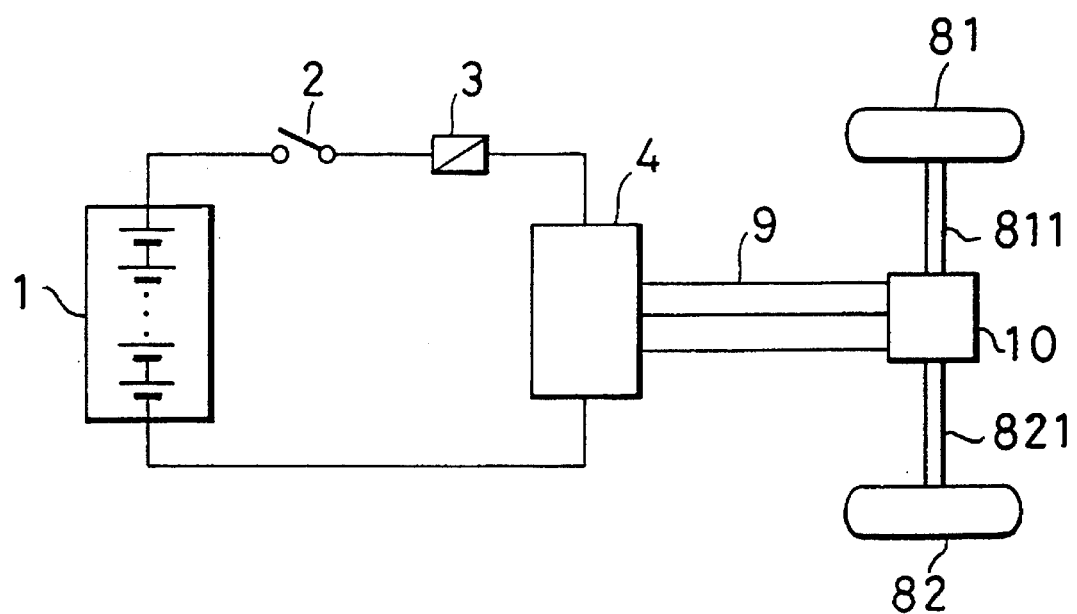
FIG. 1 is a schematic plan view of a driving system for an electric vehicle constructed according to the present invention, particularly illustrating the whole structure of the driving system.
Figure 6:
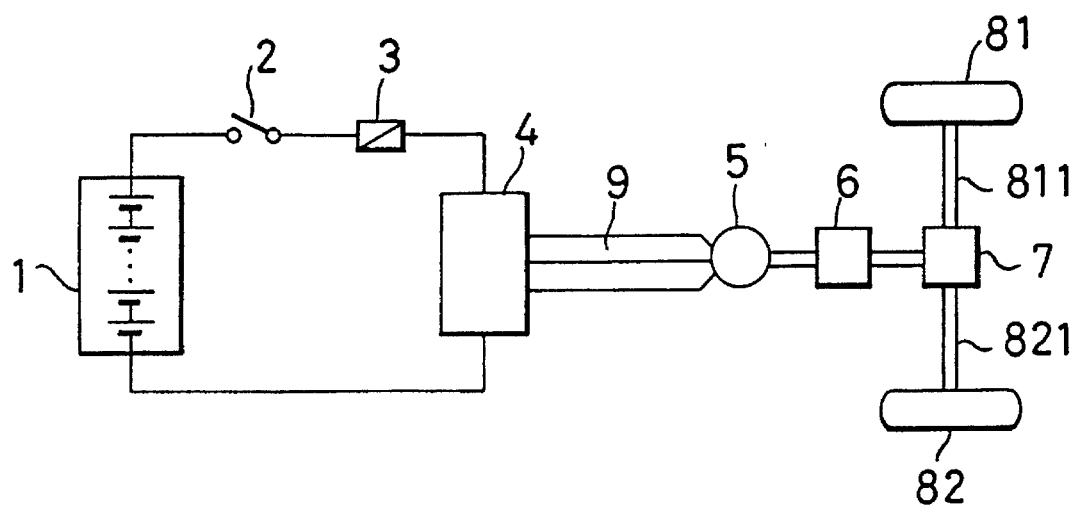
FIG. 6 is an illustrative view of a conventional driving system for an electric vehicle.
Figure 7:
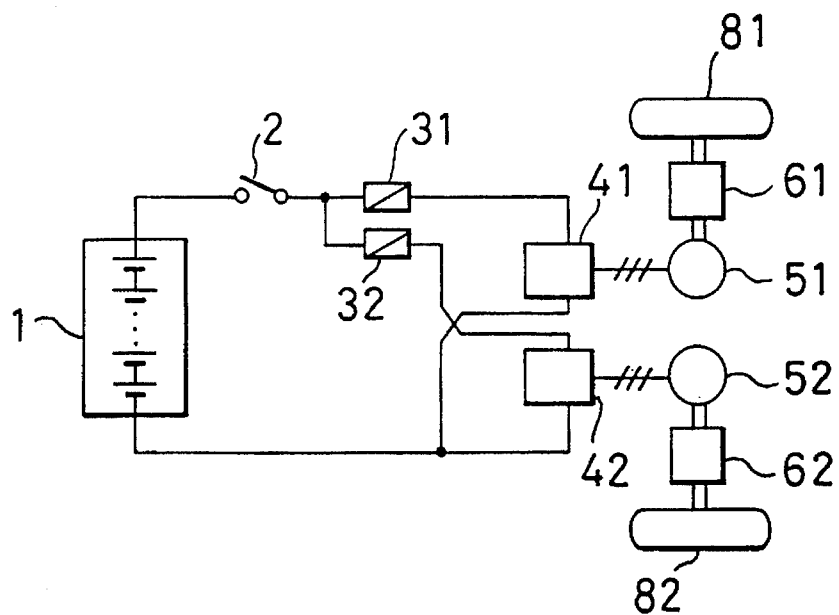
FIG. 7 is an illustrative view of another conventional driving system for an electric vehicle.

FIG. 1 shows by way of a schematic plan view the whole structure of a driving system for an electric vehicle (hereinafter referred to as an E-vehicle) constructed according to a first embodiment of the present invention, and it should be noted that components which are the same or similar components of the conventional driving system described above with reference to FIG. 6 are represented by the same reference numerals.

In FIG. 1, reference numeral 10 designates a wheel driving unit for the driving system. The wheel driving unit 10 includes an AC motor which substantially corresponds to the AC motor 5 shown in FIG. 6.

The detailed structure of the wheel driving unit 10 will be described below with reference to FIG. 2.

Figure 2:
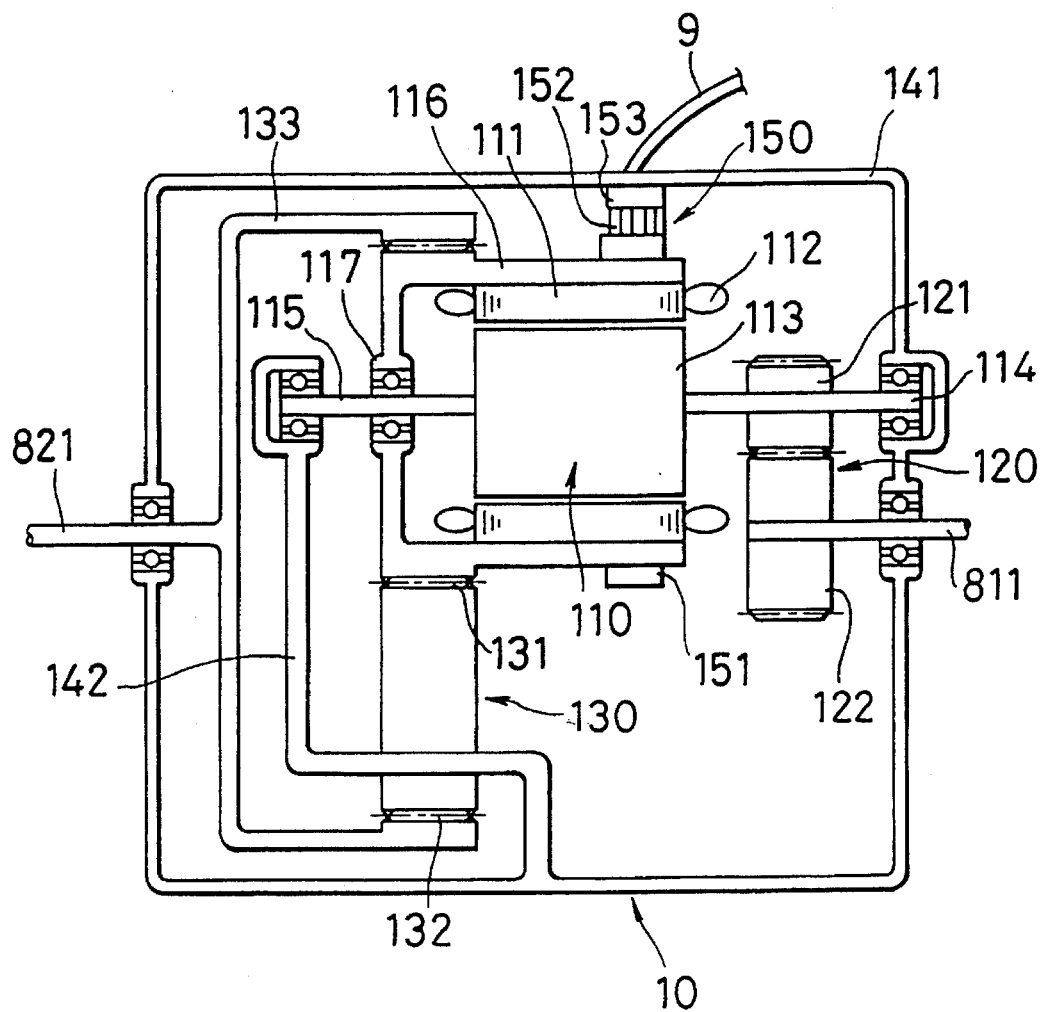
FIG. 2 is a schematic sectional view of a wheel driving unit for the driving system shown in FIG. 1 constructed according to a first embodiment of the present invention.

In FIG. 2, reference numeral 110 designates an AC motor of which the primary side (corresponding to a stator of the conventional AC motor) and the secondary side (corresponding to a rotor of the same motor) are rotatable. As is apparent from FIG. 2, the AC motor 110 is constructed in the form of an induction motor adapted to be driven by an inverter 4. Reference numeral 111 designates a core on the primary side of the AC motor 110, reference numeral 112 designates a coil on the primary side of the AC motor 110, and reference numeral 113 designates a core on the secondary side of the AC motor 110 including a coil (not shown) which serves as a rotor on the secondary side of the AC motor 110.

Reference numeral 114 designates a rotational output shaft on the secondary side of the AC motor 110 and reference numeral 115 designates a shaft which is positionally coincident with the rotation center axis of a rotary core frame 116. It should be added that the shafts 114 and 115 are arranged in a coaxial relationship relative to the rotor 113 on the secondary side of the AC motor 110. The core 111 on the primary side of the AC motor 110 is fixedly secured to the rotary core frame 116 which in turn is rotatably supported by the shaft 115 with the aid of a bearing 117.

Reference numeral 120 designates a reversible type speed reducing mechanism which includes a pair of spur gears 121 and 122 constituting a single-stage speed reducing unit. The spur gear 121 is fixedly mounted on the rotational output shaft 114 on the secondary side. The spur gear 122 meshing with the spur gear 121 is fixedly mounted on a power transmission shaft 811. As shown in FIG. 2, the shafts 114 and 811 are rotatably supported by a motor frame 141 with the aid of bearings, respectively.

Reference numeral 130 designates a non-reversible type speed reducing mechanism including an internal ring gear which constitutes a single-stage speed reducing unit. The non-reversible type speed reducing mechanism 130 is composed of a pair of gears 131 and 132. The gear 131 is designed in the form of an external gear which is arranged around the outer periphery of the rotary core frame 116, while the gear 132 meshing with the gear 131 is designed in the form of an internal ring gear which is generated around the inner periphery of a rotary frame 133 having an inner diameter larger than an outer diameter of the rotary core frame 116.

A power transmission shaft 821 is projected from the rotary frame 133 while extending along the center axis of the latter. As shown in the figure, the power transmission shaft 821 is supported by the motor frame 141 with the aid of bearings. Both the power transmission shafts 811 and 821 are arranged in the coaxial relationship relative to the motor frame 141.

The shaft 115 of the AC motor 110 is rotatably supported by a supporting member 142 at the innermost end of the latter with the aid of bearings wherein a large part of the supporting member 142 is located inside of the rotary frame 133 while extending inward from the motor frame 141.

It is desirable that the speed reduction ratio of the speed reducing section 120 be set to be equal to that of the speed reducing section 130 from the viewpoint that both the left-hand and right-hand wheels 81 and 82 of the E-vehicle exhibit the same traveling performance.

An AC current is fed to the primary coil 112 of the AC motor 110 via a slip ring section 150. A slip ring 151 of the slip ring section 150 is arranged around the outer periphery of the rotary core frame 116, while a brush holder 153 for holding brushes 152 is fixedly secured to the motor frame 141. In FIG. 2, reference numeral 9 designates a feed line by way of which an AC current is fed to the AC motor 110 from the inverter 4.

Figure 3:
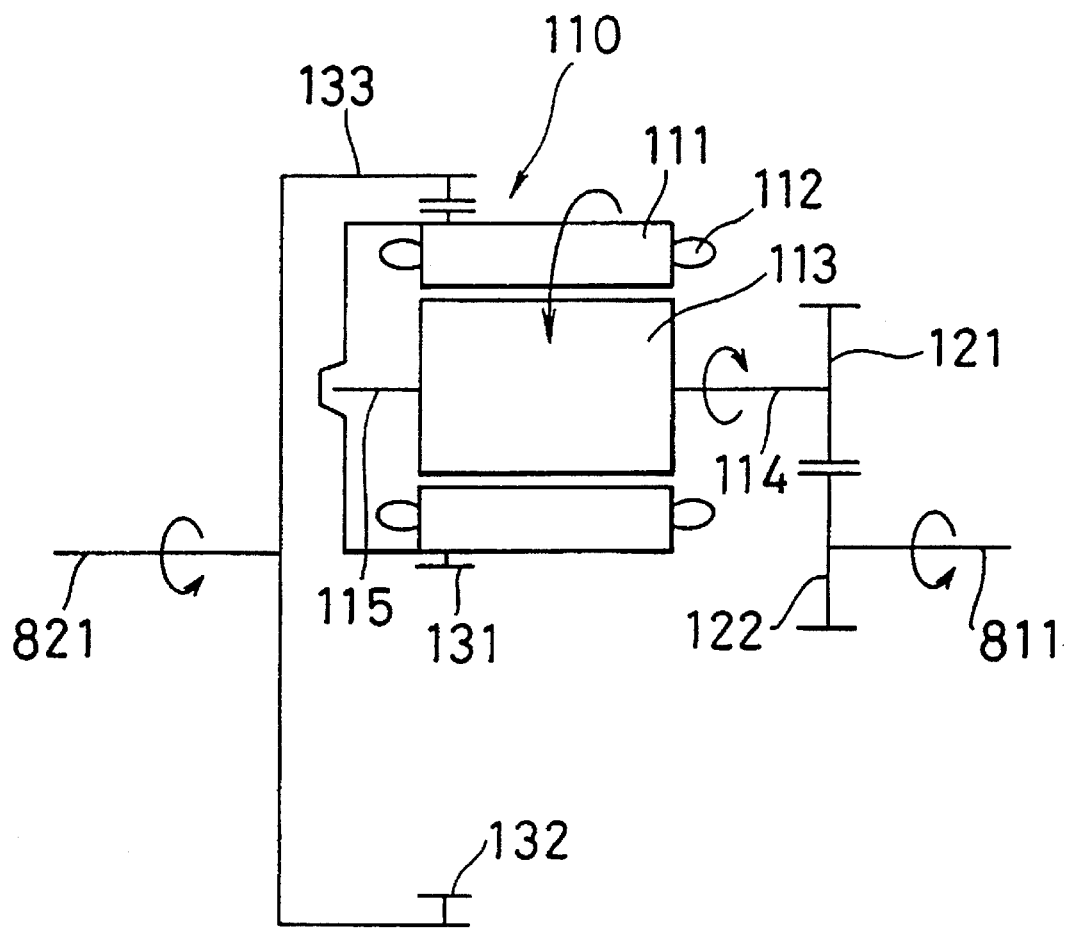
FIG. 3 is an illustrative view of the wheel driving unit shown in FIG. 2, particularly illustrating a mode of operation of the wheel driving unit.

FIG. 3 is an illustrative view of the driving system for the E-vehicle shown in FIG. 2, particularly illustrating a mode of operation of the driving system. It should be noted that the components which are the same as the components shown in FIG. 2 are represented by the same reference numerals.

It is assumed that the magnetic flux generated by the coil 112 on the primary side of the AC motor 110 is rotated in the clockwise direction as seen from the right-hand side of FIG. 3. This causes the secondary side of the AC motor 110 to rotate in the same clockwise direction as that of the magnetic flux, but the primary side of the driving system rotates in the counter-clockwise direction due to the reactive function derived from the rotational force generated by the secondary side of the AC motor 110. As the secondary side of the AC motor 110 rotates, the direction of rotation of the secondary side of the driving system is reversed relative to that of the AC motor 110 because of the arrangement of the spur gears 121 and 122 in the reverse type speed reduction section 120, whereby a rotational output from the secondary side of the driving system is transmitted to the power transmission shaft 811 via the gears 121 and 122 while the secondary side of the AC motor 110 is rotated in the clock-wise direction. On the other hand, a rotational output from the primary side of the AC motor 110 is transmitted to the power transmission shaft 821 via the gears 131 and 132 in the non-reverse type speed reducing section 130 while the direction of rotation of the primary side of the AC motor 110 is rotated in the same direction, i.e., the primary side of the AC motor 110 is rotated in the counter-clockwise direction. Consequently, the primary side and the secondary side of the AC motor 110 are rotated in the same direction to rotationally drive the wheels 81 and 82 in the same direction.

Next, the differential function of the driving system constructed according to the first embodiment of the present invention will be described below.

In this embodiment, each of the primary side and the secondary side of the AC motor 110 is freely rotatable so that the power generated by the AC motor 110 is transmitted to the wheels 81 and 82 via the reversible type speed reducing section 120, the non-reversible type speed reducing section 130 and the power transmission shafts 811 and 821.

In other words, the torque generated by the AC motor 110 is distributed into the primary side and the secondary side of the driving system corresponding to the rotary core frame 116 and the rotational output shaft 114, respectively. At this time, a ratio of the distribution of the torque into the primary side and the secondary side of the driving system varies depending on the load to be borne by each of the wheels 81 and 82.

As is apparent from the above description, it can be concluded that the wheel driving unit 10 of the driving system exhibits the same differential function as that of the conventional mechanical type differential.

Next, a driving system for an E-vehicle constructed according to a second embodiment of the present invention will be described below with reference to FIG. 4 and FIG. 5.

The structure of a wheel driving unit 10A for the driving system is substantially identical with that shown in FIG. 2 with the exception that a reversible type speed reducing section 120 and a non-reversible type speed reducing unit 130 are arranged in the reversed state as seen in the transverse direction of the figures. It should be noted that the components which are the same as the components shown in FIG. 2 are represented by the same reference numerals.

Figure 4:
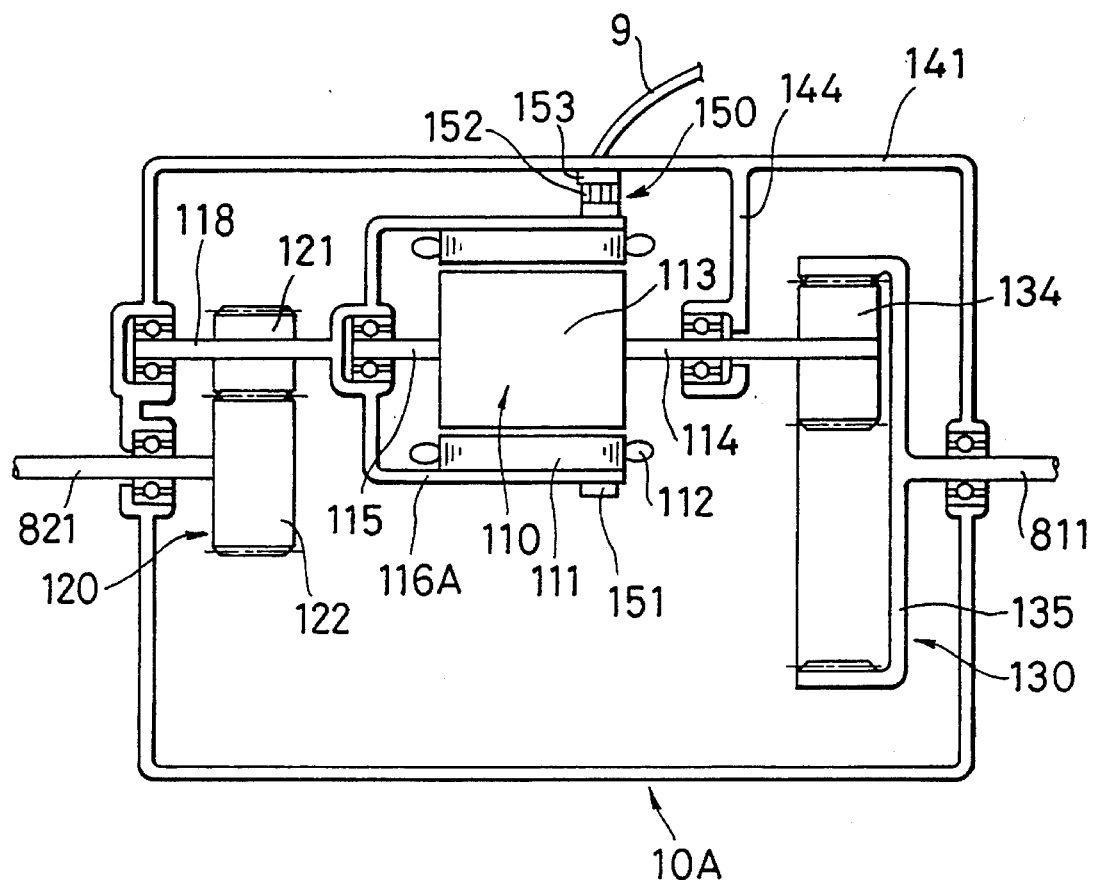
FIG. 4 is a schematic sectional view of a wheel driving unit for the driving system shown in FIG. 1 constructed according to a second embodiment of the present invention.

In FIG. 4, reference numeral 116A designates a rotary core frame on the primary side of an AC motor 110. The rotary core frame 116A is designed in the cylindrical configuration in the same manner as the frame 116 shown in FIG. 2. Reference numeral 134 designates a spur gear which is fixedly mounted on a rotational output shaft 114 to constitute a non-reversible type speed reducing section 130 in cooperation with an opponent gear 135 designed in the form of an internal ring gear. The internal ring gear 135 meshing with the spur gear 134 is operatively connected to a power transmission shaft 811. Reference numeral 144 designates a frame for supporting the rotational output shaft 114 extending between a rotor 113 on the secondary side of the AC motor 110 and the spur gear 134. The frame 144 is made integral with a motor frame 141. A rotational output shaft 118 having a spur gear 121 fixedly mounted thereon is connected to the rotary core frame 116A while extending along the rotational center axis of the same rotary core frame 116A.

Figure 5:
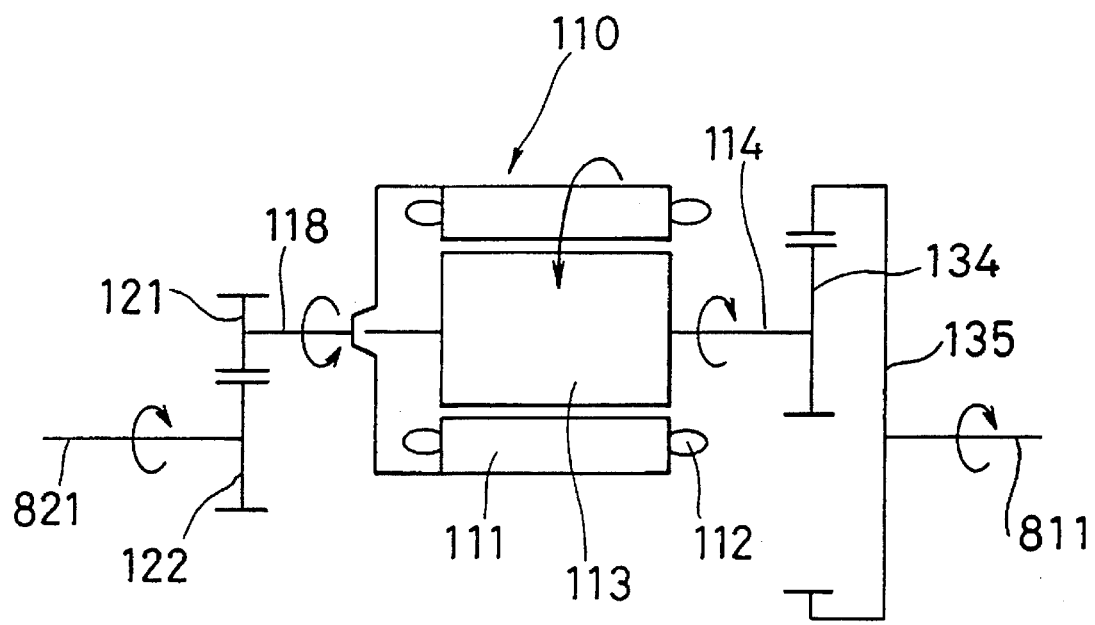
FIG. 5 is an illustrative view of the wheel driving unit for the driving system shown in FIG. 4, particularly illustrating a mode of operation of the wheel driving unit.

FIG. 5 is an illustrative view of the driving system corresponding to FIG. 4, particularly showing a mode of operation of the driving system.

An AC motor 110 shown in FIG. 5 operates in the same manner as that shown in FIG. 3 with the exception that an output from the rotational output shaft 114 is transmitted to the power transmission shaft 811 via the non-reversible type speed reducing section 130 so that the power transmission shaft 811 rotates in the same direction as that of the rotational output shaft 114. On the other hand, an output from the rotational shaft 118 connected to the rotary core frame 116A having a coil on the primary side of the AC motor 110 fixed thereto is transmitted to the power transmission shaft 821 via the reversible type speed reducing section 120 so that the direction of rotation of the rotational shaft 118 is reversed relative to the rotational shaft 114 to rotate both the power transmission shafts 811 and 821 in the same direction.

Also in this embodiment, the primary side and the secondary side of the AC motor 110 are freely rotatable so that power is transmitted to wheels 81 and 82 via the speed reducing sections 120 and 130 each comprising a pair of gears and the power transmission shafts 811 and 821.

The torque generated by the AC motor 110 is distributed into a rotational shaft 118 on the primary side of the AC motor 110 and the rotational shaft 114 on the secondary side of the AC motor 110 in the same manner as the rotational output shafts 114 and 118 in the preceding embodiment of the present invention. At this time, a ratio of torque distributed to the rotational output shaft 114 to that of the rotational output shaft 118 varies depending on the load to be borne by each of the wheels 81 and 82.

Thus, the wheel driving unit 10A constructed according to the second embodiment of the present invention exhibits the same differential function as that of the conventional mechanical type differential as mentioned above.

It is desirable that a speed reduction ratio of each of the speed reducing sections 120 and 130 is selectively determined to provide an optimum value from the viewpoint of the whole structure of the driving system of the present invention. In addition, it is desirable that the power transmission shafts 811 and 821, as shown in FIG. 2 and FIG. 4, are arranged in the coaxial relationship relative to the wheel driving unit.

Although the present invention has been described above with respect to the case that an induction motor is used as an AC motor for the wheel driving unit, it should be noted that the present invention should not be limited only to this case but it may equally be applied to the case that another type of AC motor is employed in place of the induction motor.

It should be added that the structure employed for each of the slip ring and the bearings is not limited only to that shown in FIG. 2 and FIG. 4.

The present invention has been described in detail with respect to preferred embodiments, and changes and modifications may be made without departing from the invention in its broader aspects, and it is the intention, therefore, that the appended claims cover all such changes and modifications as fall within the true spirit of the invention.

What is claimed is:

1. A driving system for an electric vehicle, the electric vehicle including a left-hand wheel, a right-hand wheel and an AC motor having a primary side and a secondary side, said primary side receiving power from a battery used as a power source, said driving system comprising;

a motor frame;

supporting means for rotatably separately supporting the primary side of said AC motor and the secondary side of said AC motor relative to said motor frame for rotation about a first axis;

a first power transmission shaft for driving one of said left-hand and right-hand wheels;

means for reversibly operatively connecting one of the primary side and the secondary side of said AC motor to said first power transmission shaft;

a second power transmission shaft for driving the other one of said left-hand and right-hand wheels;

means, comprising an external gear and an internal gear meshing with said external gear, for non-reversibly operatively connecting the other of the primary side and the secondary side of said AC motor to said second power transmission shaft; and means for feeding electricity from said battery to the primary side of said AC motor;

wherein, said first and second power transmission shafts are coaxially supported on a second axis relative to said motor frame, and said second axis is offset from and parallel to said first axis.

2. The driving system as claimed in claim 1 wherein said means for non-reversibly operatively connecting comprises a cylindrical frame having an outer periphery, the primary side of said AC motor being fixedly secured to said cylindrical frame and the secondary side of said AC motor being positioned within the primary side of said AC motor.

3. The driving system as claimed in claim 2, wherein said means for feeding electricity comprises a slip ring disposed around the outer periphery of said cylindrical frame, a brush adapted to be brought in contact with said slip ring, and a brush holder fixedly secured to said motor frame for holding said brush.

4. The driving system as claimed in claim 3, wherein said external gear is arranged around the outer periphery of said cylindrical frame, said external gear meshing with said internal gear thereby being operatively connected to said second power transmission shaft.

5. The driving system as claimed in claim 1, wherein said means for reversibly operatively connecting comprises a speed reducing mechanism having a pair of spur gears meshing with each other.

6. The driving system as claimed in claim 1, wherein said means for non-reversibly operatively connecting comprises a speed reducing mechanism.

7. The driving system as claimed in claim 1, wherein said supporting means comprises:

a cylindrical frame, the primary side of the AC motor being fixedly mounted within said frame;

a first motor shaft and a second motor shaft operatively connected to the secondary side of said AC motor, the first and second motor shafts being arranged along the first axis;

a first bearing disposed within said motor frame to rotatably support said first motor shaft;

a second bearing arranged within said motor frame to rotatably support said second motor shaft; and a third bearing disposed on said second motor shaft for rotatably supporting said cylindrical frame.

8. The driving system as claimed in claim 7, wherein said external gear is arranged around the outer periphery of said cylindrical frame and wherein said means for reversibly operatively connecting comprises a first spur gear mounted on said first motor shaft meshing with a second spur gear mounted on said first power transmission shaft.

9. The driving system as claimed in claim 1, wherein said supporting means comprises:

a first motor shaft and a second motor shaft operatively connected to the secondary side of said AC motor;

a cylindrical frame rotatable about said first axis, the primary side of said AC motor being fixedly mounted within said cylindrical frame;

a third shaft disposed along a rotational center axis of said cylindrical frame said first, second and third shafts being coaxial with said first axis;

a first bearing arranged within said motor frame for rotatably supporting said first motor shaft;

a second bearing disposed within said cylindrical frame for rotatably supporting said second motor shaft; and a third bearing disposed within said motor frame for rotatably supporting said third shaft.

10. The driving system as claimed in claim 9, further comprising:

a third spur gear disposed on said third shaft;

a fourth spur gear disposed on said first power transmission shaft, the fourth spur gear meshing with the third spur gear;

a first spur gear disposed on said first shaft; and an internal gear operatively connected to said second power transmission shaft, the internal gear meshing with the first spur gear.

11. A driving system for an electric vehicle, the electric vehicle having a vehicle body, a left-hand wheel, a right-hand wheel, an AC motor, an inverter and a battery, the AC motor having a primary side and a secondary side, the primary side of said AC motor having a coil and a core and the secondary side of said AC motor having a rotor, the AC motor being coupled to the inverter and the battery being used as a power source for the inverter, the driving system comprising:

a motor frame fixedly mounted on the vehicle body;

a core frame to which the core and coil of the primary side of the AC motor is fixedly secured;

means for separately rotatably supporting the core frame and the rotor, said core frame and said rotor being arranged on a first common axis with respect to said motor frame;

a first power transmission shaft for transmitting power to one of said left-hand and right-hand wheels;

means for operatively connecting said rotor to the first power transmission shaft, a direction of rotation of said first power transmission shaft being reversed from a direction of rotation of said rotor, and a rotational speed of said first power transmission shaft being reduced from a rotational speed of said rotor;

a second power transmission shaft for transmitting power to the other one of said left-hand and right-hand wheels;

means, comprising an external gear and an internal gear meshing with said external gear, for operatively connecting said core frame to the second power transmission shaft, a direction of rotation of said second power transmission shaft being the same as a direction of rotation of said core frame, and a rotational speed of said second power transmission shaft being reduced from a rotational speed of said core frame; and means for feeding electricity from said battery to said coil on the primary side of said AC motor via said inverter, wherein the first and second power transmission shafts are coaxially supported with respect to the motor frame on a second common axis, the second common axis being parallel to the first common axis.

12. A driving system for an electric vehicle, the electric vehicle having a vehicle body, a left-hand wheel, a right-hand wheel, an AC motor, an inverter and a battery, the AC motor having a primary side and a secondary side, the primary side of said AC motor having a coil and a core and the secondary side of said AC motor having a rotor, the AC motor being coupled to the inverter and the battery being used as a power source for the inverter, the driving system comprising:

a motor frame fixedly mounted on the vehicle body;

a core frame to which the core and coil of the primary side of the AC motor is fixedly secured, said motor frame separately rotatably supporting the core frame and the rotor, said core frame and said rotor being arranged on a first common axis with respect to said motor frame;

means, comprising an external gear and an internal gear, for operatively connecting said rotor to a second power transmission shaft for one of a left-hand wheel and a right-hand wheel, the external gear meshing with the internal gear, a direction of rotation of said second power transmission shaft being the same as a direction of rotation of said rotor and a rotational speed of said second power transmission shaft being reduced from a rotational speed of said rotor;

means for operatively connecting said core frame to a first power transmission shaft for the other one of said left-hand wheel and said right-hand wheel, a direction of rotation of said first power transmission shaft being reversed with respect to a direction of rotation of said core frame and a rotational speed of said first power transmission shaft being reduced from a rotational speed of said core frame; and means for feeding electricity from said battery to said coil on the primary side of said AC motor via said inverter, wherein the first and second power transmission shafts are coaxially supported with respect to the motor frame on a second common axis, and the second common axis is parallel to the first common axis.

* * * * *